(12) United States Patent
Villalobos-Martinez et al.

(10) Patent No.: US 12,196,891 B2
(45) Date of Patent: **\*Jan. 14, 2025**

(54) VEHICLE COMPONENT WITH IMAGE SENSOR AIMED AT FIDUCIAL MARKER

(71) Applicant: Continental Autonomous Mobility US, LLC, Auburn Hills, MI (US)

(72) Inventors: Luis Alfredo Villalobos-Martinez, Camarillo, CA (US); David Fernandez Aguilera, Goleta, CA (US); Cleveland Eugene Rayford, II, Temecula, CA (US)

(73) Assignee: Continental Autonomous Mobility US, LLC, Auburn Hills, MI (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/238,157

(22) Filed: Aug. 25, 2023

(65) Prior Publication Data

US 2023/0408659 A1 Dec. 21, 2023

Related U.S. Application Data

(62) Division of application No. 16/804,184, filed on Feb. 28, 2020, now Pat. No. 11,768,281.

(51) Int. Cl.
*G01S 7/497* (2006.01)
*B60R 11/04* (2006.01)
(Continued)

(52) U.S. Cl.
CPC ............ *G01S 7/4972* (2013.01); *B60R 11/04* (2013.01); *G01B 11/14* (2013.01); *G01B 11/26* (2013.01);
(Continued)

(58) Field of Classification Search
CPC ........ G01C 21/04; G01C 21/06; G01C 21/10; G01C 21/12; G01C 21/14; G01C 21/16; G01C 21/165; G01C 21/1652; G01C 21/1656; G01C 21/183; G01C 21/188; G01C 5/00; G01C 5/02; G05D 3/00; G05D 3/12; G05D 3/125; G05D 1/0231; G05D 1/0234; G05D 1/0236; G05D 1/0242; G05D 1/0246; G05D 1/0248; G05D 1/0251; G05D 1/0253; G12B 5/00; G01P 3/36; G01P 3/38; G01P 3/68; G01P 3/685; B60R 2300/10; B60R 2300/105; B60R 2300/108; B60R 2300/30; B60R 2300/303; B60R 2300/304; B60R 2300/402; B60R 2300/80; B60R 11/04; B60R 1/20; B60R 1/22;
(Continued)

(56) References Cited

U.S. PATENT DOCUMENTS 5,850,254 A \* 12/1998 Takano ..................... B60R 1/00
382/104
6,020,844 A \* 2/2000 Bai .......................... H01Q 3/02
342/75

(Continued)

*Primary Examiner* — Gordon J Stock, Jr.

(57) ABSTRACT

A method includes mounting a vehicle component to a base member of a vehicle, capturing a baseline image of a fiducial marker, capturing a subsequent image of the fiducial marker, comparing the subsequent image to the baseline image, and adjusting operation of the vehicle component in response to the identification of differences between the baseline image and the subsequent image.

5 Claims, 6 Drawing Sheets

(51) Int. Cl.
*G01B 11/14* (2006.01)
*G01B 11/26* (2006.01)
*G01B 11/27* (2006.01)
*G01S 7/481* (2006.01)
*G12B 5/00* (2006.01)

(52) U.S. Cl.
CPC .......... *G01B 11/272* (2013.01); *G01S 7/4813* (2013.01); *G01S 7/497* (2013.01); *G12B 5/00* (2013.01)

(58) Field of Classification Search
CPC .... B60R 1/23; B60R 1/24; B60R 1/25; B60R 1/26; B60R 1/27; B60R 1/28; B60R 1/29; B60R 1/30; B60R 1/31; G01B 11/14; G01B 11/26; G01B 11/27; G01B 11/272; G01S 7/4808; G01S 7/481; G01S 7/4811; G01S 7/4812; G01S 7/4813; G01S 7/497; G01S 7/4972; G01S 17/02; G01S 17/04; G01S 17/06; G01S 17/50; G01S 17/58; G01S 17/66; G01S 17/86; G01S 17/87; G01S 17/875; G01S 17/88; G01S 17/93; G01S 17/931; G01S 17/933
See application file for complete search history.

(56) References Cited

U.S. PATENT DOCUMENTS

| | | | | |
|---|---|---|---|---|
| 6,653,650 | B2* | 11/2003 | McMillan | G01C 25/00 250/548 |
| 8,604,968 | B2* | 12/2013 | Alland | B60R 1/00 342/22 |
| 8,737,685 | B2* | 5/2014 | Becker | G06T 7/254 382/103 |
| 9,612,111 | B2* | 4/2017 | Koresko | F41G 1/54 |
| 10,295,654 | B2* | 5/2019 | Yukumatsu | G01S 7/40 |
| 10,401,501 | B2* | 9/2019 | Wood | G01S 17/931 |
| 10,502,812 | B2* | 12/2019 | Fujii | G01S 7/4026 |
| 10,607,310 | B1* | 3/2020 | Thomas | G06V 10/751 |
| 10,732,268 | B1* | 8/2020 | Diehl | G01S 17/87 |
| 10,816,648 | B2* | 10/2020 | Pennecot | G01S 17/89 |
| 11,376,960 | B2* | 7/2022 | Hao | G01S 13/931 |
| 11,754,386 | B2* | 9/2023 | Heymer | G01B 11/26 |
| 11,768,281 | B2* | 9/2023 | Villalobos-Martinez | G01B 11/14 356/620 |
| 2016/0191901 | A1* | 6/2016 | Stegall | H04N 23/56 348/49 |
| 2019/0204425 | A1* | 7/2019 | Abari | G05D 1/0011 |
| 2020/0158840 | A1* | 5/2020 | Ikram | G06T 7/80 |
| 2020/0191927 | A1* | 6/2020 | Lin | G01S 17/931 |
| 2020/0217928 | A1* | 7/2020 | Pinnock | G01S 13/86 |
| 2021/0124051 | A1* | 4/2021 | Lu | G01H 9/00 |
| 2022/0050190 | A1* | 2/2022 | Boka | G01S 13/931 |
| 2023/0400552 | A1* | 12/2023 | Disaro | G01S 13/931 |

* cited by examiner

VEHICLE COMPONENT WITH IMAGE SENSOR AIMED AT FIDUCIAL MARKER

CROSS-REFERENCE TO RELATED APPLICATIONS

This application is a divisional of prior application Ser. No. 16/804,184, filed Feb. 28, 2020.

BACKGROUND

Vehicles includes several type of vehicle components that require proper aim for proper operation of the vehicle component. The vehicle may include a base member to which the vehicle component is mounted. After the vehicle component is mounted to the base member, the vehicle component may be inadvertently moved relative to the base member, e.g., by being unintentionally impacted by high force. This movement may affect desired operation of the vehicle component.

One example of a vehicle component is a lidar sensor. The lidar sensor, e.g., a solid-state lidar sensor. In such an example, the solid-state lidar sensor may be mounted on the vehicle to detect objects in the environment surrounding the vehicle and to detect distances of those objects for environmental mapping. The detection of reflected light is used to generate a 3D environmental map of the surrounding environment. The output of the solid-state lidar sensor may be used, for example, to autonomously or semi-autonomously control operation of the vehicle, e.g., propulsion, braking, steering, etc. Specifically, the system may be a component of or in communication with an advanced driver-assistance system (ADAS) of the vehicle. Other examples of vehicle components that require proper aim may include exterior radar systems, exterior camera systems, exterior ultrasonic systems, headlamp systems, heads-up-display assemblies, interior vision systems, airbag systems, etc.

DETAILED DESCRIPTION

Figure 1:
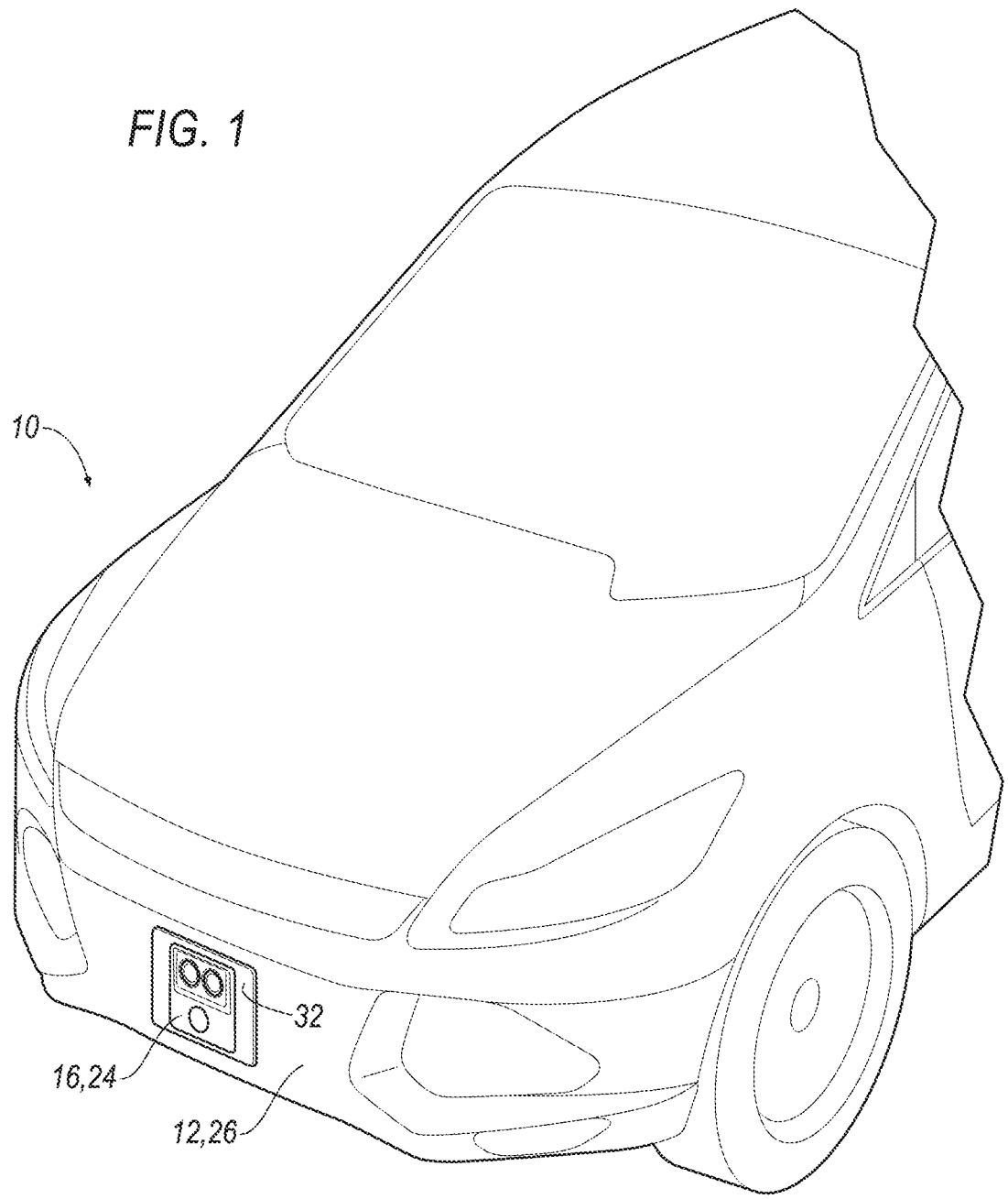
FIG. 1 is a perspective view of a portion of a vehicle including a vehicle component (in the form of a lidar sensor) mounted to a base member (in the form of a bumper).

With reference to the Figures, wherein like numerals indicate like parts throughout the several views, a vehicle 10 includes a base member 12 having a fiducial marker 14, a vehicle component 16 having a housing 18 mounted to the base member 12, the vehicle component 16 having an operational device 20 in the housing 18, and an image sensor 22 fixed to the housing 18 and aimed at the fiducial marker 14.

The image sensor 22 may repeatedly capture images of the fiducial marker 14 to determine whether the vehicle component 16 has remained stationary relative to the base member 12 or has moved relative to the base member 12. In the event of detection of movement between the vehicle component 16 and the base member 12, the vehicle component 16 may be adjusted, e.g., disabled, re-aimed, etc., to prevent unintended operation of the vehicle component 16.

Figure 8:
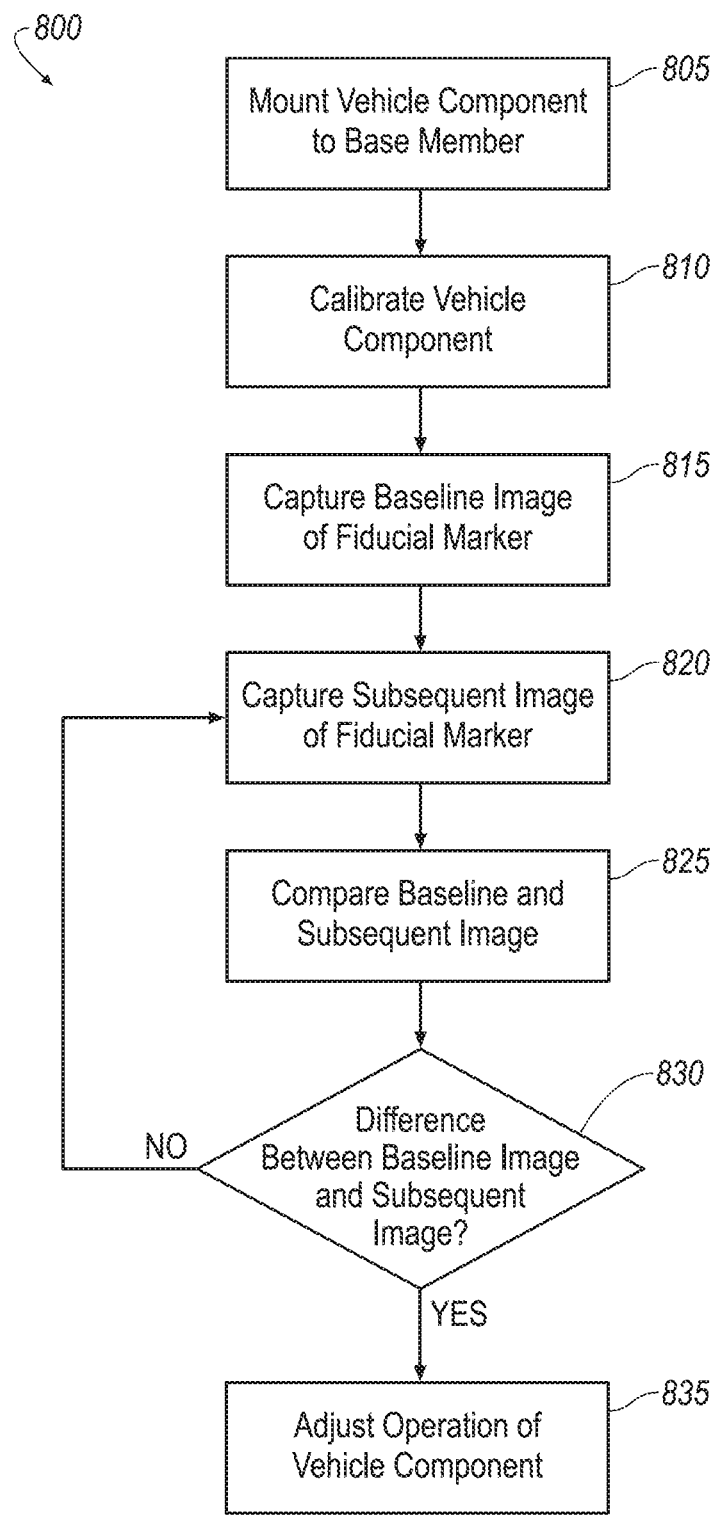
FIG. 8 is a method of operating the vehicle component.

With reference to FIG. 8, a method 800 includes mounting the vehicle component 16 to the base member 12 of a vehicle 10, capturing a baseline image of the fiducial marker 14 on the base member 12 with an image sensor 22 of the vehicle component 16, capturing a subsequent image of the fiducial marker 14 with the image sensor 22, comparing the subsequent image to the baseline image and identifying differences between the subsequent image and the baseline image resulting from movement of the vehicle component 16 relative to the base member 12, and adjusting operation of the vehicle component 16 in response to the identification of differences between the baseline image and the subsequent image.

The adjustment of the operation of the vehicle component 16, e.g., disablement, re-aiming, etc., prevents unintended operation of the vehicle component 16. The capture and comparison of the subsequent image allows for the position of the vehicle component 16 relative to the base member 12 to be monitored and for action to be taken in the event of movement of the vehicle component 16 relative to the base member 12.

With reference to FIG. 1, the vehicle 10 shown is a passenger automobile. As other examples, the vehicle 10 may be of any suitable manned or un-manned type including a plane, satellite, drone, watercraft, etc.

The vehicle component 16 and the base member 12 may be at any suitable position of the vehicle 10. As one example, the vehicle component 16 may be an exterior component of the vehicle 10. Examples include exterior vision systems such as lidar systems (such as lidar assembly 24 in the Figures), radar systems, camera systems, ultrasonic systems, etc. Other examples include headlamp systems. As another example, the vehicle component 16 may be an interior component. Examples include heads-up display (HUD) assemblies, interior vision systems, airbag systems, etc.

The base member 12 supports the vehicle component 16. The base member 12 may be, for example, a structural component of the vehicle 10 such as a vehicle frame or a vehicle body.

In the example shown in the Figures, the base member 12 is a bumper 26 and the vehicle component 16 is the lidar assembly 24. As other examples the base member 12 may be an exterior component such a door, a body panel, rear bumper, etc., that supports the lidar assembly 24 or other type of vehicle component 16 on the exterior of the vehicle 10. As another example, the base member 12 may be a vehicle body panel, e.g., a fender, and the vehicle component 16 may be a headlamp system or taillight system.

As another example, the base member 12 may be an interior component of the vehicle e.g., an instrument panel, a vehicle seat, a vehicle door, etc. For example, the interior component may be an instrument panel and the vehicle component 16 may be a HUD or an airbag assembly. As another example, the base member 12 may be a vehicle seat, e.g., a frame of a vehicle seat, and the vehicle component 16 may be an airbag assembly.

Figure 2:
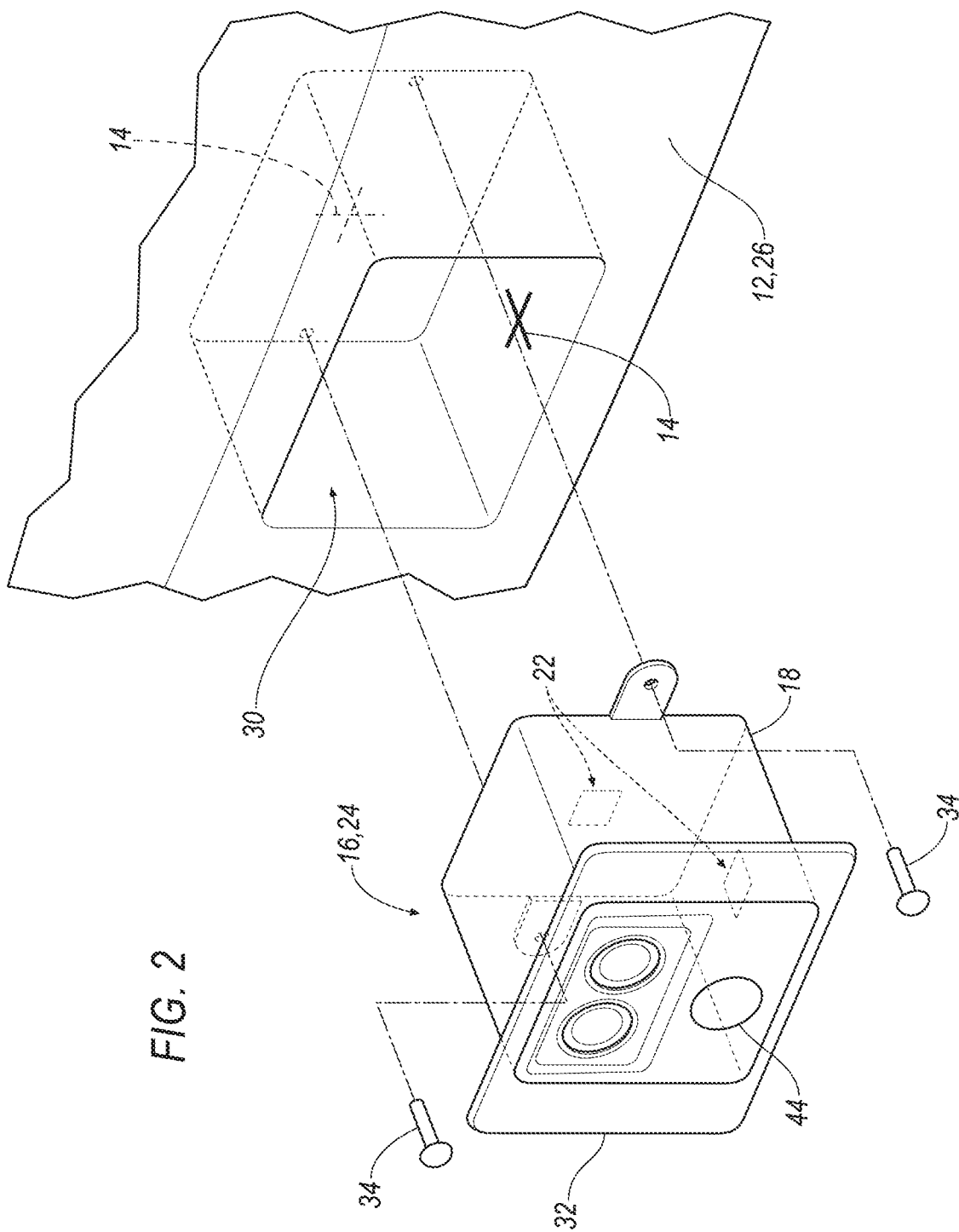
FIG. 2 is an exploded view of the vehicle component and the base member with image sensors on the vehicle component.
Figure 4:
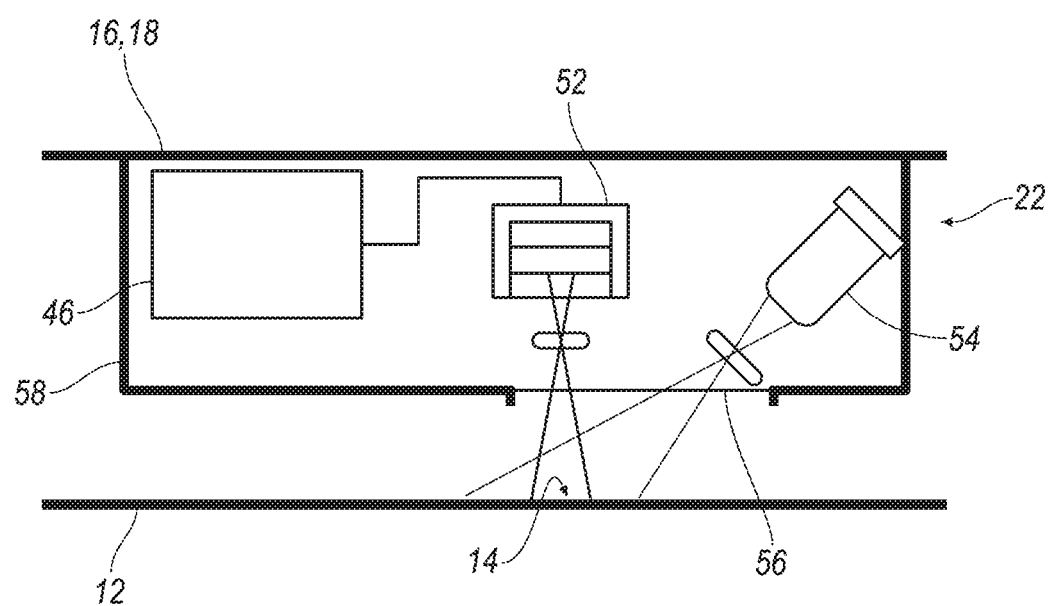
FIG. 4 is a schematic view of a portion of the vehicle including the base member and the vehicle component including the image sensors.

With reference to FIG. 2, the base member 12 has the fiducial marker 14. As set forth above and described further below, the image sensor 22 of the vehicle component 16 is aimed at the fiducial marker 14. Images of the fiducial marker 14 captured by the image sensor 22 are used to confirm the position of the vehicle component 16 relative to the base member 12. The fiducial marker 14 may include, for example, one or more line or other shapes. The fiducial marker 14 is dimensioned, e.g., sized and shaped, to be detected by the image sensor 22. As shown in FIG. 4, the image sensor 22 is spaced from the fiducial marker 14.

The fiducial marker 14 is fixed relative to the rest of the base member 12, i.e., is immovable relative to the rest of the base member 12 in the absence of destructive force. As an example, the fiducial marker 14 may be etched into the base member 12 (with "etched" being a description of the structural characteristics of the fiducial marker 14). As another example, the fiducial marker 14 may be paint that is painted on the base member 12. As another example, the fiducial marker 14 may be a sticker adhered to the base member 12. In any event, the fiducial marker 14 may be plastic, metal, ceramic, composite material, etc. As another example, the fiducial marker 14 may light. As an example, the fiducial marker 14 may be light shaped and projected onto the base member 12.

The base member 12 may include more than one fiducial marker 14 and a corresponding number of image sensors 22 may be fixed to the housing each aimed at a respective one of the fiducial markers 14. In such examples, the fiducial markers 14 are spaced from each other. The fiducial markers 14 may be in separate planes. The example shown in the Figures includes two fiducial markers 14 and two image sensors 22. In the example shown in the Figures, the two fiducial markers 14 are in planes that are orthogonal to each other. Accordingly, both image sensors 22 in combination detect movement of the vehicle component 16 relative to the base member in six degrees of freedom (specifically X, Y, Z, pitch, yaw, and roll). Another example may include one fiducial marker 14 and one image sensor 22. Other examples may include more than two fiducial markers 14 and a corresponding number of image sensors 22. For example, such a configuration may increase the accuracy of measurement of relative movement and/or may provide failure redundancy.

The base member 12 may define a cavity 28 that receives the vehicle component 16. In such examples, the fiducial marker 14 may be in the cavity 28. Specifically, the base member 12 may include walls 30 defining the cavity 28 and the fiducial marker 14 may be on the walls 30. In the example shown in the Figures, the bumper 26 includes the cavity 28 that receives the lidar assembly 24. The base member 12 and/or the vehicle component 16 may include a bezel 32 therebetween to enclose the cavity 28.

With reference to FIG. 1, the vehicle component 16 may be flush with the base member 12. Specifically, the base member 12 may have an exterior surface and the vehicle component 16 may have a face (e.g. the face of the bezel 32) flush with external surface of base member 12. The external surface of the base member 12 may be a class-A surface, i.e., a finished surface exposed to view by a customer and free of unaesthetic blemishes and defects.

Figure 3:
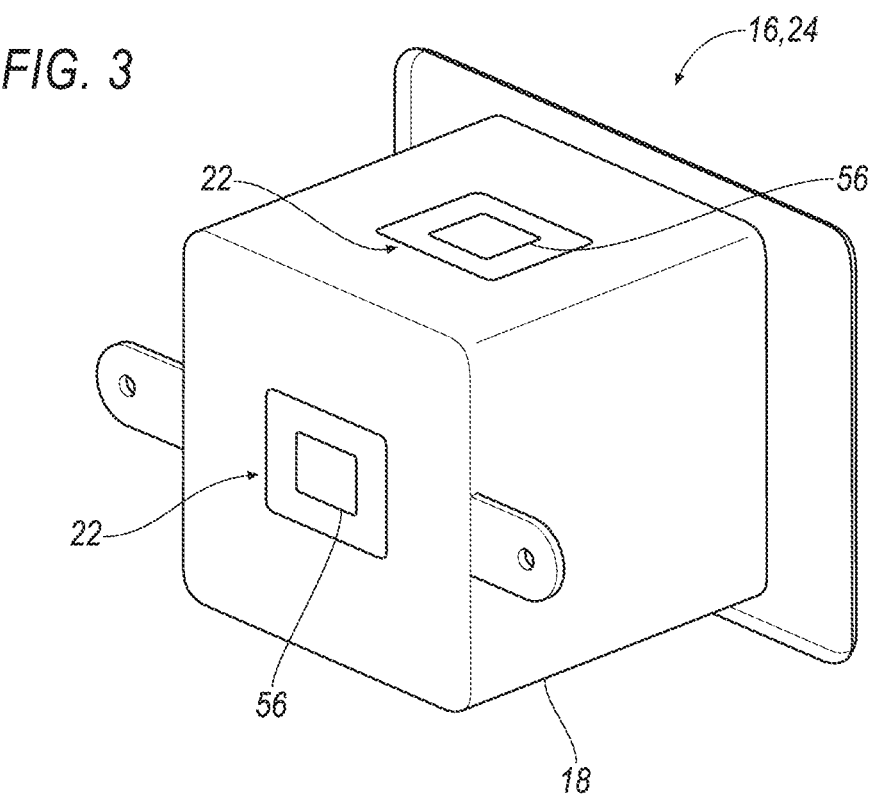
FIG. 3 is a perspective view of a back side and a bottom side of the vehicle component including the image sensors on the back side and the bottom side.
Figure 5:
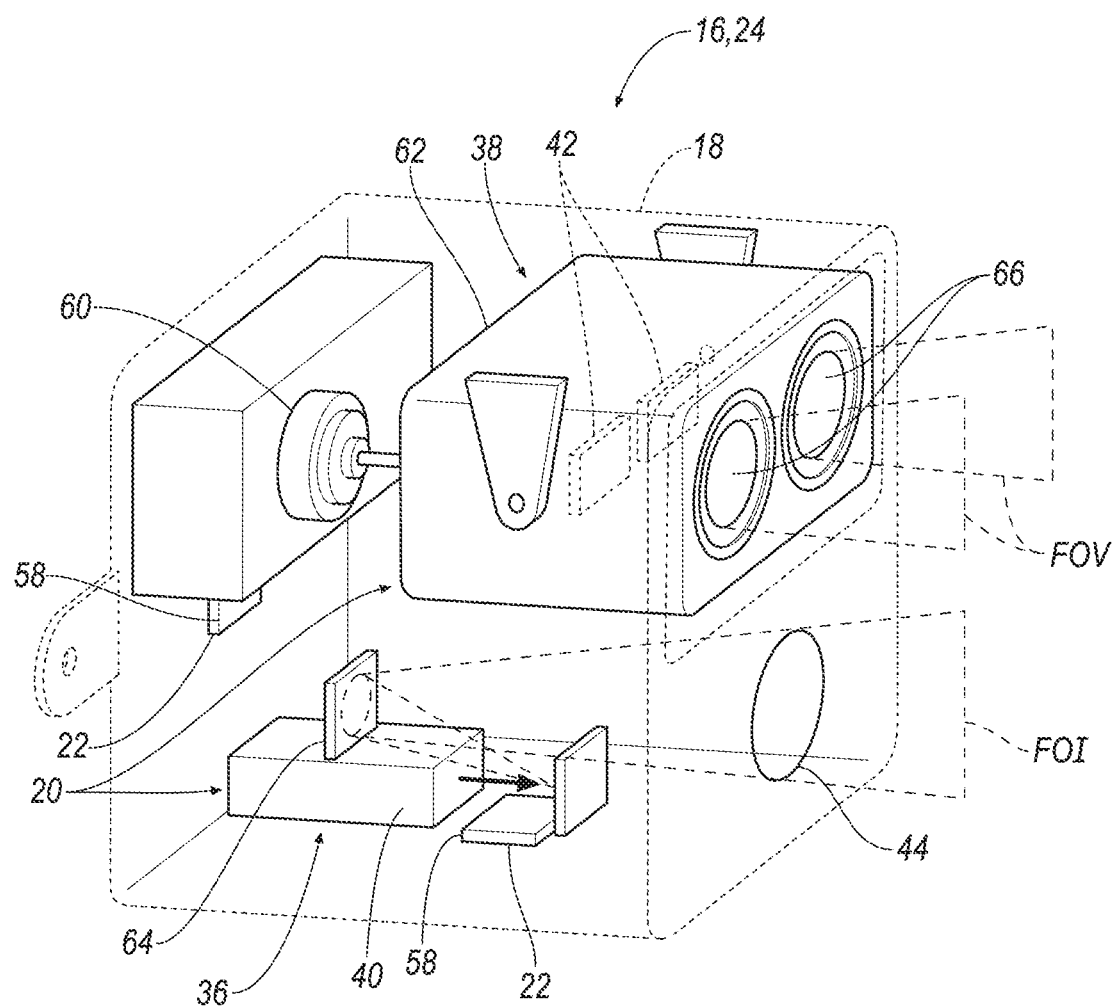
FIG. 5 is a perspective view of the vehicle component with a housing of the vehicle component shown in broken lines.

With reference to FIGS. 3-5, as set forth above, the vehicle component 16 has the housing 18, the operational device 20 in the housing 18, and the image sensor 22 fixed to the housing 18. The vehicle component 16 is mounted to the base member 12. Specifically, the housing 18 is mounted to the base member 12. The vehicle component 16, e.g., the housing 18, may be fastened directly to the base member 12 with fasteners 34. In such an example, the fasteners 34 may be threaded fasteners, rivets, push-in rivets (e.g. Christmas tree fasteners), etc. When fastened to the base member 12, the housing 18 is fixed to the base member 12, i.e., is not movable relative to the base member 12 without removal of the fasteners 34 or destructive force.

The operational device 20 is in the housing 18. The operational device 20 receives data from the vehicle 10 and/or provides data to the vehicle 10. In the example of the Figures in which the vehicle component 16 is a lidar assembly 24, the operational device 20 includes a light-transmitting system 36 and a light-receiving system 38 of the lidar assembly 24, as described below. Specifically, the operational device 20 includes a light source 54 (hereinafter the "lidar light source 40") and a light sensor (hereinafter the "lidar light sensor 42). In such an example, the operational device 20 provides data regarding object detection and/or environmental mapping, as described further below. As other examples, the operational device 20 may include a light source 54, e.g., a light bulb, LED, etc., of a headlamp or taillight; a projector of a HUD assembly; an inflator and airbag of an airbag assembly, etc.

The image sensor 22 is fixed to the housing 18. In other words, the image sensor 22 is not movable relative to the housing 18 without destructive force.

The image sensor 22 is aimed at the fiducial marker 14. In other words, the image sensor 22 is positioned to capture images of the fiducial marker 14. Specifically, the image sensor 22 includes photodetectors 52 aimed at the fiducial marker 14. The photodetectors 52 capture light reflected by the fiducial marker 14 to create an image of the fiducial marker 14. The photodetectors 52 may be of any suitable type. For example, the image sensor 22 may be of a known type such as a charge-coupled device (CCD), a complementary metal-oxide-semiconductor (CMOS), etc., and the photodetectors 52 may be of known types for such applications. The image sensor 22 may also be referred to as an optical sensor.

In addition to the photodetectors 52, the image sensor 22 may include a light source 54 aimed at the fiducial marker 14. In other words, the light source 54 illuminates the fiducial marker 14 at least when the image sensor 22 captures the images of the fiducial marker 14. The light source 54 emits light at a wavelength detectable by the photodetectors 52 so that the photodetectors 52 detect light from the light source 54 reflected by the fiducial marker 14. The lights source may be, for example, a laser, a light-emitting diode (LED) or any suitable type for detection of light by the photodetectors 52.

The image sensor 22 may include a housing 58 that houses the photodetectors 52 and the light source 54. The housing 58 is fixed to the housing 18 of the vehicle component 16 in any suitable fashion. The image sensor 22 includes a window 58 through which the light source 54 can direct light and through which the photodetectors 52 detect light.

As set forth above, the vehicle component 16 may be the lidar assembly 24. In such examples the operational device 20 includes the light-transmitting system 36 and the light-receiving system 38 of the lidar assembly 24. Specifically, the operational device 20 includes the lidar light source 40 and the lidar light sensor 42.

The lidar assembly 24 is shown in FIG. 1 as being mounted on the vehicle 10. In such an example, the lidar assembly 24 is operated to detect objects in the environment surrounding the vehicle 10 and to detect distance, i.e., range, of those objects for environmental mapping. The output of the lidar assembly 24 may be used, for example, to autonomously or semi-autonomously control operation of the vehicle 10, e.g., propulsion, braking, steering, etc. Specifically, the lidar assembly 24 may be a component of or in communication with an advanced driver-assistance system (ADAS) of the vehicle 10. The lidar assembly 24 may be mounted on the vehicle 10 in any suitable position and aimed in any suitable direction. As one example, the lidar assembly 24 in FIG. 1 is shown on the front of the vehicle 10 and directed forward.

The lidar assembly 24 emits light and detects the emitted light that is reflected by an object, e.g., pedestrians, street signs, vehicles, etc. Specifically, the lidar assembly 24 includes the light-transmitting system 36 and the light-receiving system 38. The light-transmitting system 36 includes the lidar light source 40 that emits light for illuminating objects for detection. The light-transmitting system 36 includes an exit window 44 and may include a beam-steering device 64, transmission optics, (i.e., focusing optics), etc., between the light source 54 and the exit window 44. The vehicle 10 and/or the lidar assembly 24 computer 46 is in communication with the lidar light source 40 for controlling the emission of light from the lidar light source 40. The transmission optics shape the light from the light source 54 and guide the light through the exit window 44 to a field of illumination FOI.

The light-receiving system 38 has a field of view (hereinafter "FOV") that overlaps the field of illumination FOI and receives light reflected by objects in the FOV. The light-receiving system 38 may include receiving optics and a light sensor having an array of photodetectors. The light-receiving system 38 may include a receiving window 66 and the receiving optics may be between the receiving window 66 and the array of photodetectors of the light-receiving system 38. The receiving optics may be of any suitable type and size.

The lidar assembly 24 may be a solid-state lidar assembly 24. In such an example, the lidar assembly 24 is stationary relative to the vehicle 10. For example, the lidar assembly 24 may include the housing 18 that is fixed relative to the vehicle 10, i.e., does not move relative to the component of the vehicle 10 to which the casing 62 is attached, and one or more substrates, e.g., silicon chips, of the lidar assembly 24 are supported in the housing 18.

As a solid-state lidar assembly 24, the lidar assembly 24 may be a flash lidar assembly 24. In such an example, the lidar assembly 24 emits pulses, i.e., flashes, of light into the field of illumination FOI. More specifically, the lidar assembly 24 may be a 3D flash lidar assembly 24 that generates a 3D environmental map of the surrounding environment. In a flash lidar assembly 24, the FOI illuminates an FOV that includes more than one photodetector, e.g., a 2D array, even if the illuminated 2D array is not the entire 2D array of the light sensor of the light-receiving system 38.

The lidar assembly 24 may be a unit, i.e., the light-transmitting system 36 and the light-receiving system 38 enclosed by the housing 18. The exit window 44 and a receiving window extends through the housing 18. The exit window 44 and the receiving window 66 each include an aperture extending through the housing 18 and may include a lens or other optical device in the aperture.

The housing 18, for example, may be plastic or metal and may protect the other components of the lidar assembly 24 from moisture, environmental precipitation, dust, etc. In the alternative to the lidar assembly 24 being a unit, components of the lidar assembly 24, e.g., the light-transmitting system 36 and the light-receiving system 38, may be separated and disposed at different locations of the vehicle 10.

The lidar light source 40 emits light into the field of illumination FOI for detection by the light-receiving system 38 when the light is reflected by an object in the field of view FOV. The lidar light source 40 may be, for example, a laser. The lidar light source 40 may be, for example, a semiconductor laser. In one example, the lidar light source 40 is a vertical-cavity 28 surface-emitting laser (VCSEL). As another example, the lidar light source 40 may be a diode-pumped solid-state laser (DPSSL). As another example, the lidar light source 40 may be an edge emitting laser diode. The lidar light source 40 may be designed to emit a pulsed flash of light, e.g., a pulsed laser light. Specifically, the light source 54, e.g., the VCSEL or DPSSL or edge source, is designed to emit a pulsed laser light. The light emitted by the lidar light source 40 may be, for example, infrared light. Alternatively, the light emitted by the lidar light source 40 may be of any suitable wavelength. The lidar assembly 24 may include any suitable number of lidar light sources 40, i.e., one or more in the casing 62. In examples that include more than one lidar light source 40, the light sources 54 may be identical or different.

The lidar light source 40 may be stationary relative to the casing 62. In other words, the lidar light source 40 does not move relative to the casing 62 during operation of the system, e.g., during light emission. The lidar light source 40 may be mounted to the housing 18 in any suitable fashion such that the lidar light source 40 and the housing 18 move together as a unit.

As set forth above, the light-receiving system 38 includes the lidar light sensor 42 including the array of photodetectors, i.e., a photodetector array. The lidar light sensor 42 includes a chip and the array of photodetectors is on the chip. The chip may be silicon (Si), indium gallium arsenide (InGaAs), germanium (Ge), etc., as is known. The array of photodetectors of the light-receiving system 38 is 2-dimensional. Specifically, the array of photodetectors includes a plurality of photodetectors arranged in a columns and rows.

Each photodetector of the lidar light sensor 42 is light sensitive. Specifically, each photodetector detects photons by photo-excitation of electric carriers. An output signal from the photodetector indicates detection of light and may be proportional to the amount of detected light. The output signals of each photodetector are collected to generate a scene detected by the photodetector. The photodetectors of the light-receiving system 38 may be of any suitable type, e.g., photodiodes (i.e., a semiconductor device having a p-n junction or a p-i-n junction) including avalanche photodiodes, metal-semiconductor-metal photodetectors, phototransistors, photoconductive detectors, phototubes, photomultipliers, etc. As an example, the photodetectors may each be a silicon photomultiplier (SiPM). As another example, the photodetectors may each be or a PIN diode. Each photodetector may also be referred to as a pixel.

The operational device 20 may be adjustable relative to the housing 18. Specifically, the light-transmitting system 36 and/or the light-receiving system 38 of the lidar assembly 24 may be adjustable relative to the housing 18. In the example shown in FIG. 5, the light-receiving system 38 is adjustable relative to the housing 18. Specifically, the lidar assembly 24 may include a casing 62 rotatably supported by the housing 18. The casing 62 supports the components of the light-receiving system 38 and the casing 62 may be rotated relative to the housing 18, e.g., with the use of a motor 60 (e.g., the stepper motor in the Figures), to vertically adjust the aim of the FOV. In such examples, when the FOV is vertically adjusted, a beam-steering device 64 of the light-transmitting system 36 may move the FOI accordingly to detect light from the light-transmitting system 36.

Figure 6:
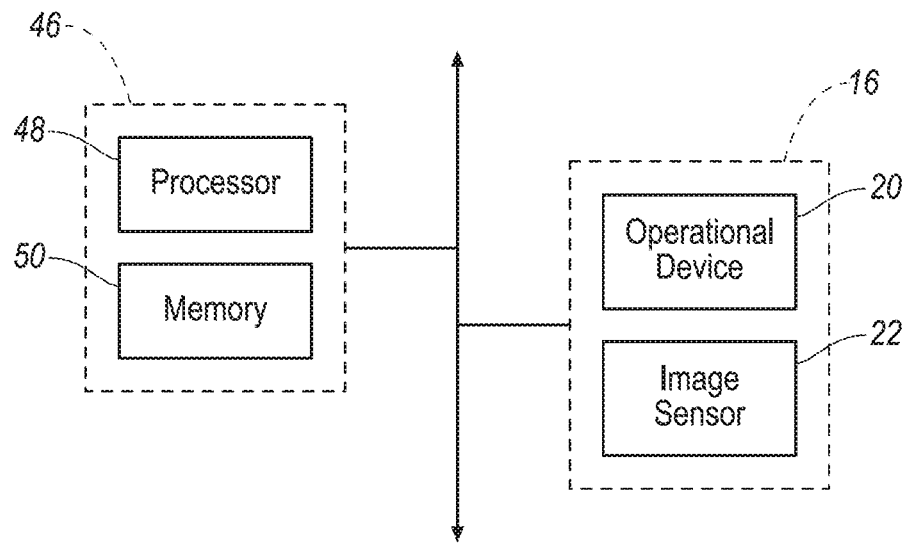
FIG. 6 is a block diagram of a computer and the vehicle component.
Figure 7:
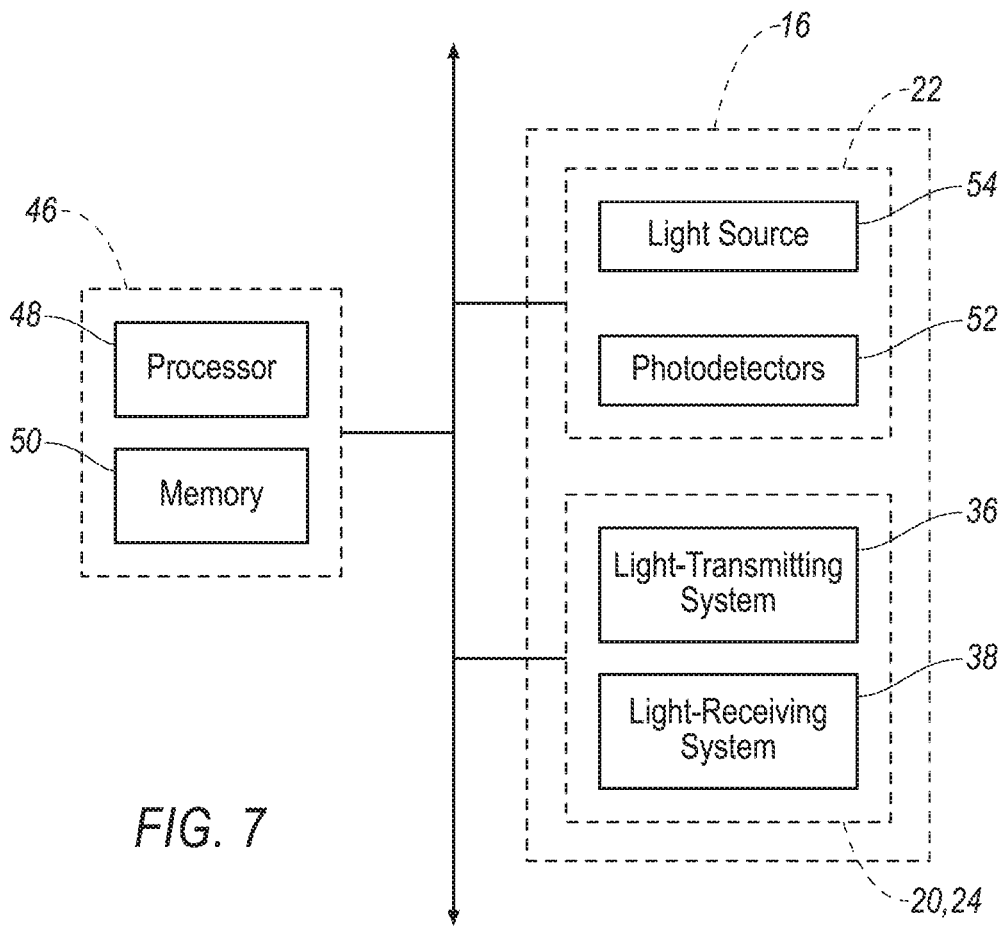
FIG. 7 is a block another diagram of the computer and the vehicle component in an example in which the vehicle component is a lidar sensor.

The computer 46 has the processor 48 and memory 50 storing instructions executable by the processor 48 to adjust operation of the vehicle component 16 based on images captured by the image sensor 22, as described further below. The computer 46 may be a component of the vehicle 10 (i.e., external to the vehicle component 16) or may be a component of the vehicle component 16 (i.e., internal to the vehicle component 16). The computer 46 may be a microprocessor-based controller or field programmable gate array (FPGA), or a combination of both, implemented via circuits, chips, and/or other electronic components. In other words, the computer 46 is a physical, i.e., structural, component of the vehicle 10. With reference to FIGS. 6 and 7, the computer 46 includes the processor 48, memory 50, etc. The memory 50 of the computer 46 may store instructions executable by the processor 48, i.e., processor-executable instructions, and/or may store data. The computer 46 may be in communication with a communication network of the vehicle 10 to send and/or receive instructions from the vehicle 10, e.g., components of the ADAS. The instructions stored on the memory 50 of the computer 46 include instructions to perform the method 800 in FIG. 8. Use herein (including with reference to the method 800 in FIG. 8) of "based on," "in response to," and "upon determining," indicates a causal relationship, not merely a temporal relationship.

The memory 50 stores instructions executable by the processor 48 to capture images of the fiducial marker 14, as shown in the method 800 at blocks 815 and 820. The image sensor 22 may capture the images of the fiducial marker 14 in any suitable fashion, e.g., by operation of the photodetectors 52 (e.g., CCD, CMOS, etc., or other known technology). Capturing the images of the fiducial marker 14 may include illuminating the fiducial marker 14 with the light source 54. The light source 54 may be illuminated simultaneously with operation of the photodetectors 52 of the image sensor 22.

The instructions include instructions to capture a baseline image of the fiducial marker 14 with the image sensor 22. The method 800 includes the step of capturing the baseline image, as shown in block 815 of FIG. 8. The baseline image may be captured before initial operation of the vehicle 10. As described further below, the baseline image is used as a baseline for later comparison to determine whether the vehicle component 16 has moved relative to the base member 12 and should thus be adjusted.

The instructions include instructions to capture the subsequent image of the fiducial marker 14 with the image sensor 22 after capture of the baseline image. The capture of subsequent images may be repeated for repeated comparison of to the baseline image, as described further below and as shown in FIG. 8. The repeated capture of subsequent images may be periodic, i.e., at a repeated time interval. As another example, the repeated capture may be triggered by vehicle operation, e.g., upon initial startup of the vehicle 10, upon initial use of the vehicle component 16 after startup of the vehicle 10, at shutdown of the vehicle 10, etc.

The instructions include instructions to compare the subsequent image to the baseline image to determine if differences exist between the subsequent image and the baseline image. The method 800 includes the step of comparing the baseline image to the subsequent image in block 825 of FIG. 8. As shown in FIG. 8, the comparison at block 825 may be repeated for multiple subsequent images. In other words, each subsequent image is compared to the baseline image. The subsequent image may be compared to the baseline image using any suitable image comparison method, software, etc., including those currently known.

The comparison, specifically, is to determine whether a difference between the subsequent image and the baseline image is a difference resulting from movement of the vehicle component 16 relative to the base member 12. For example, differences of a suitable magnitude or type may be indicative of movement of the vehicle component 16 relative to the base member 12 and the comparison at block 825 identifies such differences.

As shown in decision block 830, another subsequent image may be captured in the event that no differences are identified in the comparison of the subsequent image and the baseline image. In the event a difference is identified between the subsequent image and the baseline image, the instructions include instructions to adjust operation of the vehicle component 16. Specifically, the instructions include instructions to adjust operation of the vehicle component 16 if differences are identified between the baseline image and the subsequent image indicating movement of the vehicle component 16 relative to the base member 12. The method 800 includes adjusting operation of the vehicle component 16 at block 835.

Specifically, adjustment of the operation includes software disablement of the vehicle component 16, physical disablement of the vehicle component 16, software adjustment of the vehicle component 16, physical adjustment of the vehicle component 16, etc. For example, in the example shown in the Figures in which the vehicle component 16 is the lidar assembly 24 including a lidar light source 40 and a lidar light detector, adjustment of the operation of the vehicle component 16 includes disabling the lidar light source 40 to prevent further emission of light from the lidar light source 40 external to the lidar assembly 24. This may include un-powering the lidar light source 40 and/or physically blocking emission of light from the lidar light source 40 external to the housing 18. As another example, adjustment of the operation of the vehicle component 16 includes adjusting the aim of the lidar light source 40 and/or the lidar light detector. For example, the adjustment of the aim of the lidar light detector may include adjustment of the motor 60 to adjust the housing 18 relative to the casing 62. As another example, adjustment of the aim of the lidar light detector may include adjustment of a beam-steering device 64, mirrors, etc., of the light-transmitting system 36.

As other examples, the adjustment of the operation of the vehicle component 16 may include disabling the software and/or mechanically disabling the operation of exterior radar systems, exterior camera systems, exterior ultrasonic systems, headlamp systems, HUD assemblies, interior vision systems, airbag systems, etc. As other examples, the adjustment of operation of the vehicle component 16 may include software adjustment and/or physical adjustment to adjust the aim, position, etc., of exterior radar systems, exterior camera systems, exterior ultrasonic systems, headlamp systems, HUD assemblies, interior vision systems, airbag systems, etc.

Blocks 805 and 810 of FIG. 8 are performed before the capture of the baseline image. Specifically, the method includes mounting the vehicle component 16 to the base member 12, as shown in block 805. Specifically, mounting the vehicle component 16 to the base member 12 may include fastening a housing 18 of the vehicle component 16 directly to the bae member with a fastener. Examples of such attachment is shown in FIG. 2.

After the vehicle component 16 is mounted to the base member 12, the vehicle component 16 may be calibrated. The method may include calibrating the vehicle component 16 in block 810 of FIG. 8. Specifically, the memory 50 stores instructions to calibrate the vehicle component 16 before capturing the baseline image. In the example shown in the Figures including the lidar assembly 24, the memory 50 may store instructions executable by the processor 48 to calibrate the aim of the lidar light source 40 and/or the lidar light sensor 42 of the lidar assembly 24 before capturing the baseline image. In other words, the aim of the lidar light source 40 and/or the lidar light sensor 42 may be adjusted to provide desired performance, e.g., illumination and detection relative to horizon. The calibration may be automatically performed by the computer 46, manually performed by the computer 46 (i.e., when prompted by a human).

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method comprising:
   mounting a vehicle component to a base member of a vehicle;
   capturing a baseline image of a fiducial marker on the base member with an image sensor of the vehicle component;
   capturing a subsequent image of the fiducial marker with the image sensor;
   comparing the subsequent image to the baseline image and identifying differences between the subsequent image and the baseline image resulting from movement of the vehicle component relative to the base member; and
   adjusting operation of the vehicle component in response to the identification of differences between the baseline image and the subsequent image;
   wherein the vehicle component is a lidar sensor and adjusting the operation of the vehicle component includes adjusting the aim of a lidar light source of the lidar sensor.

2. The method as set forth in claim 1, further comprising calibrating the vehicle component after mounting the vehicle component to the base member and before capturing the baseline image.

3. The method as set forth in claim 1, wherein mounting the vehicle component to the base member includes fastening a housing of the vehicle component directly to the base member with a fastener.

4. The method as set forth in claim 1, wherein adjusting the operation of the vehicle component includes adjusting the aim of a lidar light detector of the lidar sensor.

5. The method as set forth in claim 4, further comprising calibrating the aim of the lidar light source and/or the lidar light sensor of the lidar sensor before capturing the baseline image.

* * * * *